_United States Patent Office_

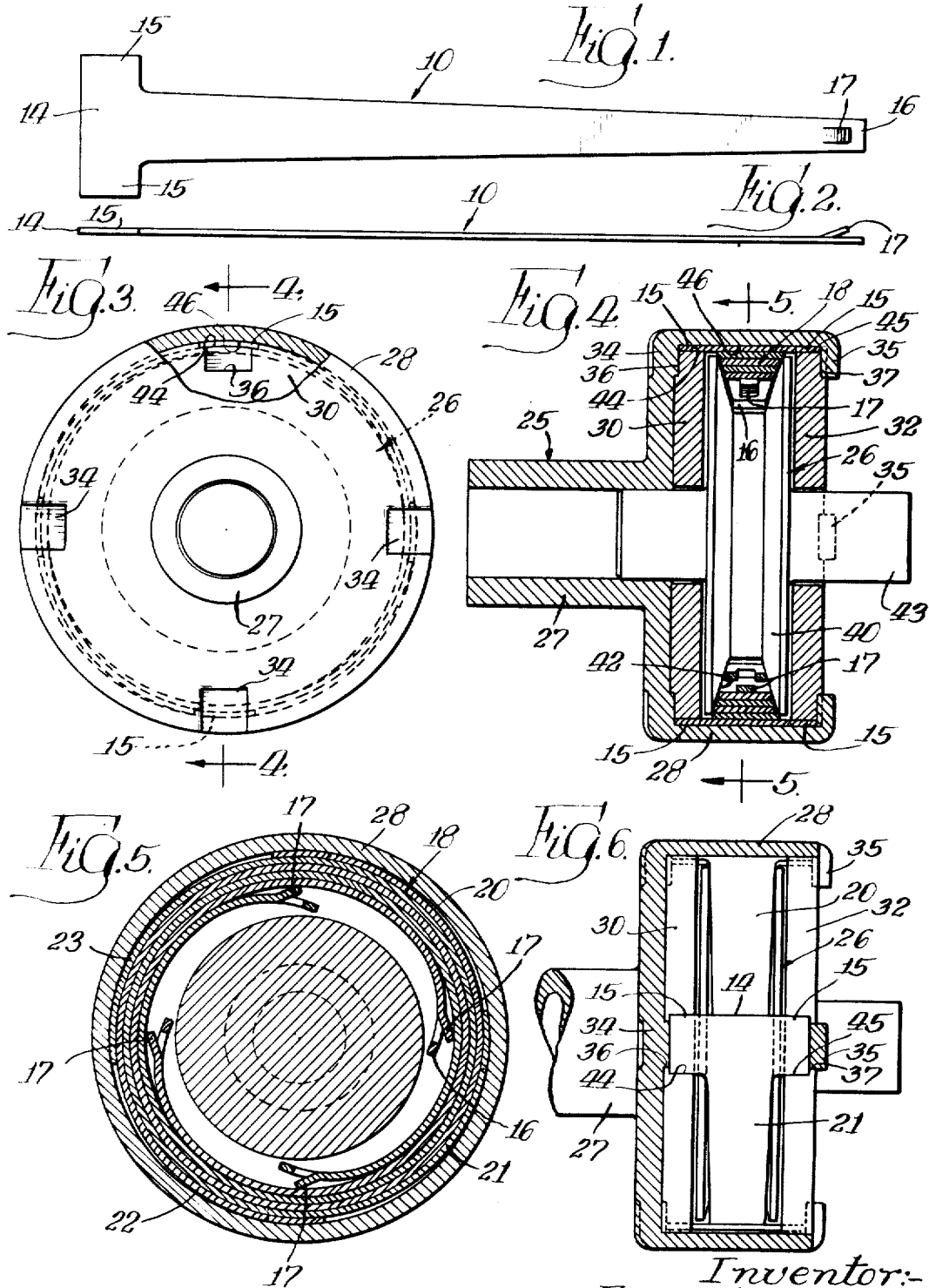

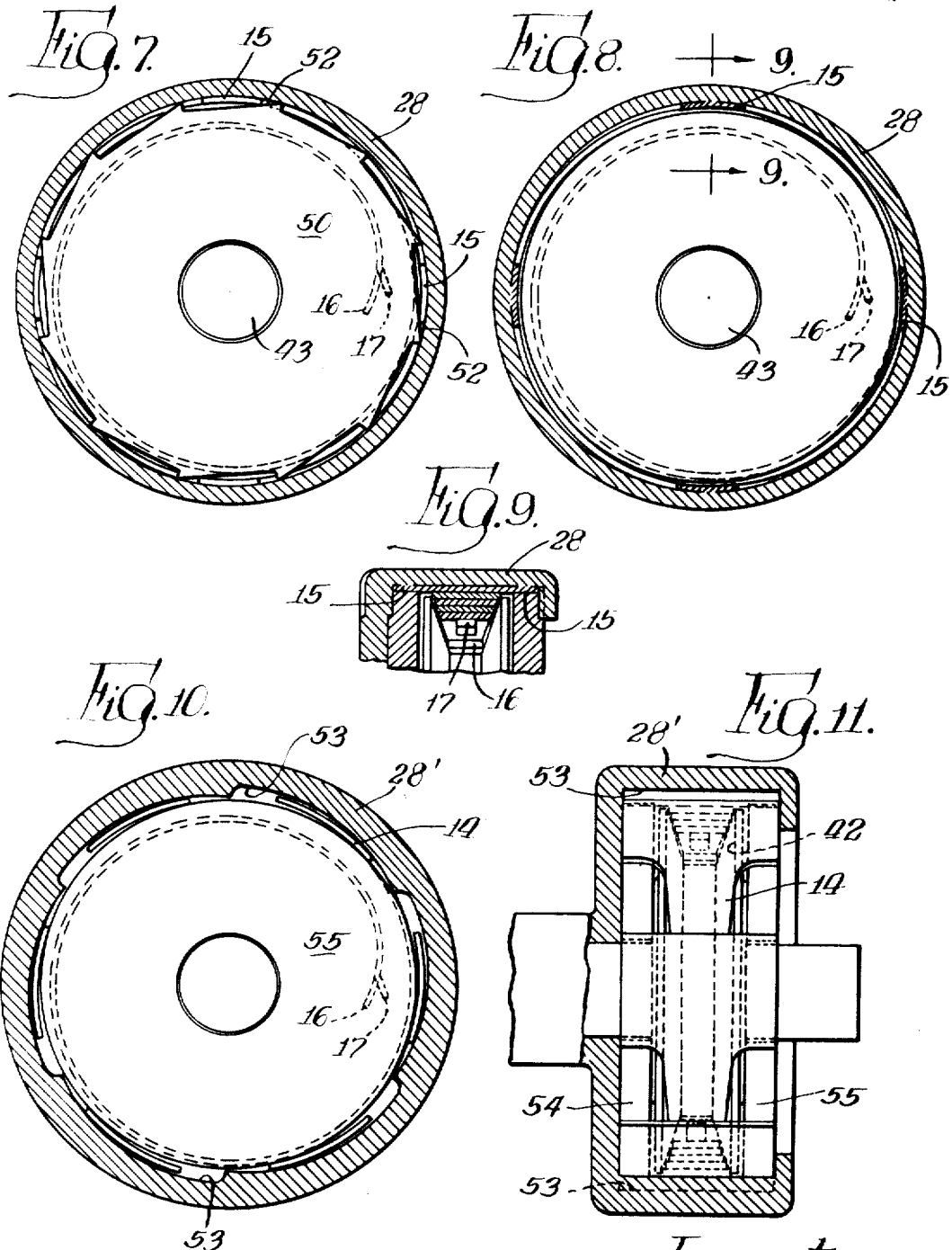

3,412,833
Patented Nov. 26, 1968

3,412,833
BAND CLUTCH CONSTRUCTIONS
Ernest U. Lang, Niles, Mich., assignor to National-Standard Company, Niles, Mich., a corporation of Delaware
Filed June 20, 1966, Ser. No. 558,818
8 Claims. (Cl. 192—81)

ABSTRACT OF THE DISCLOSURE

An overrunning band clutch embodying a plurality of interfitting overlapping tapered bands anchored at their wide ends in a first clutch member, in which the narrower ends of the bands extend into a V-groove of a second clutch member for engaging the side edges of such narrower ends with the side edges of the V-groove, and in which the bands at the narrower ends thereof have radially outwardly extending projections for engaging a portion of the inner surface of an overlapping band. A tapered spiral clutch band having laterally extending ears at its wide end for anchoring the clutch band in a clutch drive member.

---

The present invention relates to overrunning clutch constructions of the class embodying clutch drive and clutch driven means disposed coaxially with respect to each other together with torque transmitting means defined by a plurality of interfitting and overlapping tapered spiral bands disposed in a peripheral V-groove in one of the clutch means, and in which the wider ends of each of the bands is anchored to the other of the clutch means with the narrower ends of the bands being free.

A clutch construction of the character aforenoted is well known and is typically shown and described in U.S. Patent No. 2,518,453 issued Aug. 15, 1954, to John M. Dodwell.

In the known clutches of the aforementioned class frequently the side edges of the aforementioned clutch bands do not satisfactorily engage with the side walls of the V-groove upon clutching of the drive and driven clutch members. The clutch bands as aforenoted are tapered from an anchored wide end thereof to a narrow free end of the band and it is the primary purpose of the present invention to provide a construction to initiate engagement of the narrower free end of a clutch band in the V-groove to clutch the drive and driven clutch members together for conjoint rotation.

The present invention further comprehends the provision of novel anchor means for anchoring one of the ends of each of the clutch bands to one of the clutch members to assure that the several bands are brought into wedging engagement with the sides of the V-groove to share equally the load of the clutching engagement between the clutch drive and driven members.

The above and other objects and advantages of the invention will appear from the following detailed description of certain preferred embodiments of the invention.

The preferred embodiments of the invention are disclosed in accompanying drawings in which—

FIGURE 1 is a plan view of a clutch band blank for forming a clutch band of the invention;

FIGURE 2 is a side elevational view of the clutch band blank of FIGURE 1;

FIGURE 3 is an end elevational view partly broken away of one embodiment of a clutch of the present invention;

FIGURE 4 is a longitudinal vertical sectional view of the clutch of FIGURE 3 with the view being taken along the line 4—4 on FIGURE 3 looking in the direction indicated by the arrows;

FIGURE 5 is a transverse vertical sectional view of the clutch of FIGURE 3 with the view being taken along the line 5—5 on FIGURE 4 looking in the direction indicated by the arrows;

FIGURE 6 is a view similar to FIGURE 4 but showing certain of the parts in elevation;

FIGURE 7 is a transverse cross sectional view of another form of clutch of the invention;

FIGURE 8 is a transverse cross sectional view of still another form of clutch of the present invention;

FIGURE 9 is a detail vertical sectional view taken substantially along the line 9—9 of FIGURE 8 looking in the direction indicated by the arrows;

FIGURE 10 is a transverse cross sectional view of still another form of clutch of the present invention; and FIGURE 11 is a side elevational view of the clutch of FIGURE 10.

Referring now to FIGURES 1 and 2, there is shown a clutch band blank for forming a clutch band according to the present invention. The band indicated at 10 is preferably fabricated of spring steel and is tapered in width from one to the other end thereof. Band 10 at its wider end 14 is provided with laterally extending ears 15—15. At the narrower end 16 of the band a projection, as at 17, is formed by piercing the metal adjacent the tip of the band. The blank 10 is formed into a spiral configuration and as will subsequently appear, a plurality of such bands are arranged in interfitting and overlapping relation to provide a torque transmitting means 18 for the clutch of the present invention.

In FIGURES 3 through 6, there is shown one of the preferred clutch constructions of the present invention embodying torque transmitting means 18 which comprises an arrangement of four clutch bands 20, 21, 22 and 23 each being formed from a clutch band blank as aforedescribed and nested in interfitting and overlapping relation as best seen in FIGURE 5. Any number of bands may be employed depending on the torque requirements for which the clutch is to be used. The clutch of the last noted figures comprises drive clutch means 25 and driven clutch means indicated generally at 26. The drive clutch means 25 comprises a drive shaft 27, adapted to be driven by any suitable power supply source, and which shaft 27 is at one end thereof provided with an annular cup-shaped housing or hub portion 28.

A pair of thrust washers 30 and 32 are contained within the cup-shaped housing 28 with the thrust washer 30 being disposed at the inner end or base of the cup-shaped housing and with the thrust washer 32 being disposed adjacent the open end of the housing. The thrust washers 30 and 32 are keyed to the cup-shaped housing by a plurality of lug portions 34 and 35 formed to seat in indentations 36 and 37 of the thrust washers 30 and 32, respectively.

The driven clutch means 26 comprises a sheave member 40 having an inwardly extending peripheral V-groove 42 from which an output or driven shaft 43 extends through an opening in the thrust washer 32. The aforementioned torque transmitting means 18 is disposed in the V-groove 42 with the wider ends of the several bands 20 through 23 having the ear portions 15 thereof anchored in slots formed by recesses 44 and 45 in thrust washers 30 and 32, respectively, and the adjacent inner surface portions 46 of the cup-shaped housing 28.

As best seen in FIGURE 5, the several narrower ends of the several bands 20 through 23 are disposed in staggered relation with the projections 17 at the narrower ends of each of the bands 20 through 23 extending radially outwardly into engagement with the inner surface of an adjacent overlapping band.

In the clutch above described, upon rotation of clutch drive means 25 in a counterclockwise direction, as viewed in FIGURE 5, the several bands 20 through 23 are radially contracted to frictionally engage the side edges of the bands into driving relation with the side walls of the V-groove 42 of the member 40, to drive the driven clutch means 26 in a counterclockwise direction. In the event the driven clutch means 26 overruns the drive clutch means 25 the several bands unwind to release the frictional driving engagement of the side edges of the several clutch bands with the side walls of the V-groove.

In the aforedescribed clutch construction, the projections 17 of the several clutch bands upon radial contraction thereof bias the narrower inner end of the several bands into the V-groove to insure engagement of the sides of the bands with the sides of the V-groove. The projections 17 in effect serve as reaction points to force the narrower ends of the several bands for effecting frictional engagement of the band sides with the sides of the V-groove. The construction above described thus assures engagement of the sides of the several bands with the sides of the V-groove in clutching of the clutch drive means 25 with the clutch driven means 26.

In the clutch construction of FIGURE 7 a pair of thrust washers, such as shown at 50, may be substituted for the aforedescribed thrust washers 30 and 32. The thrust washer 50 is provided with a plurality of cam surfaces 52 about the periphery thereof which provide for camming engagement with the ears 15 of the wide ends of the several bands. In this arrangement of the parts the cam surfaces 52 provide for relative circumferential movement of the several bands to insure engagement of the band sides of all of the bands of the V-groove of the clutch.

Another alternate form of construction is shown in FIGURES 8 and 9 in which the ears 15 of the several bands may be brazed to the cup-shape housing 28 of the clutch drive means for purposes of anchoring the several bands to the latter.

Upon reference to FIGURES 10 and 11, there is shown still another form of clutch construction in which cam surfaces 53 are formed inwardly of the inner surface of a cup-shape housing 28' of clutch drive means. In this instance, the wide ends 14 of the band lie in the openings defined by the cam surfaces and the peripheries of thrust washers 54 and 55, respectively, with said cam surfaces 53 providing for support of the anchored ends of the bands substantially tangentially to the V-shape groove 42 of the driven clutch means. In the last noted arrangement of parts the thrust washers as at 54 and 55 need not be anchored to the outer cup-shape housing 28'.

While certain preferred embodiments of the invention have been shown and described it will be understood that various modifications and rearrangements may be made therein without departing from the spirit and scope of the invention.

The invention claimed is:

1. In a clutch having clutch drive and clutch driven means disposed coaxially with each other and in which one of said means has a peripheral V-groove therein, the combination of one-way torque transmitting means comprising a plurality of interfitting and overlapping spiral bands disposed in said V-groove of said one of said clutch means, each of said bands being anchored at one end thereof to the other of said clutch means and tapering from said one end toward the other end thereof, each of said bands at said other end having a projection extending radially outwardly from a surface thereof for engagement with a portion of the inner surface of an adjacent overlapping band.

2. The clutch of claim 1 characterized by said clutch drive and driven means being disposed with one end of each thereof in telescoping relation, in which said one end of said bands are anchored by cam means in said one of said clutch means, and in which said cam means provide for relative circumferential movement of the several bands with respect to each other.

3. The clutch of claim 2 in which said cam means are formed at said one end of the inner clutch means.

4. The clutch of claim 2 in which said cam means are formed at said one end of the outer clutch means.

5. The clutch of claim 1 characterized by one of said clutch means having said peripheral V-groove disposed with one end thereof telescopically axially inwardly of one end of said other clutch means, in which thrust washers are keyed to said other clutch means at opposite sides of said one clutch means, in which said thrust washers have recesses therein, and in which said one end of each of said bands is anchored in a slot formed between said recesses of said thrust washers and the inner surface of said other clutch means.

6. The clutch of claim 1 in which said projection is defined by a displaced portion of said band at said other end thereof.

7. The clutch of claim 1 in which said bands at said one end thereof have laterally extending ears for anchoring said bands to said other of said clutch means.

8. In a clutch having clutch drive and driven clutch means disposed coaxially with each other and in which one of said clutch means has a peripheral V-groove therein, the combination of one-way torque transmitting means comprising a plurality of interfitting and overlapping spiral bands, each of said bands tapering in width from one end toward the other end thereof, each of said bands having laterally extending ears at the wider ends thereof, said other clutch means having recesses therein adjacent the wide end of each band, the ears of said bands extending into said recesses and thereby securing the bands to the other clutch member, and with the narrower ends of said bands extending into said V-groove of said one clutch means.

References Cited

UNITED STATES PATENTS

| 2,895,578 | 7/1959 | Winchell | 192—41 |
| 2,939,561 | 6/1960 | Rudisch | 192—41 |
| 3,117,660 | 1/1964 | Dodwell | 192—41 |

BENJAMIN W. WYCHE III, *Primary Examiner.*

L. J. PAYNE, *Assistant Examiner.*